(12) United States Patent
Khalfan

(10) Patent No.: US 12,211,031 B2
(45) Date of Patent: Jan. 28, 2025

(54) SYSTEMS AND METHODS TO COMPILATE AN EXPERIENCE SUMMARY BASED ON REAL-WORLD EXPERIENCES

(71) Applicant: Disney Enterprises, Inc., Burbank, CA (US)

(72) Inventor: Alif Khalfan, Redwood City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 196 days.

(21) Appl. No.: 17/884,322

(22) Filed: Aug. 9, 2022

(65) Prior Publication Data

US 2023/0052381 A1 Feb. 16, 2023

Related U.S. Application Data

(60) Provisional application No. 63/231,978, filed on Aug. 11, 2021.

(51) Int. Cl.
*G06Q 20/36* (2012.01)

(52) U.S. Cl.
CPC ..... *G06Q 20/3674* (2013.01); *G06Q 2220/00* (2013.01)

(58) Field of Classification Search
CPC ........... G06Q 20/3674; G06Q 2220/00; G06Q 30/06; G06Q 50/01; G06Q 10/10; H04L 9/0891; H04L 9/50
See application file for complete search history.

(56) References Cited

U.S. PATENT DOCUMENTS

| | | | |
|---|---|---|---|
| 1,004,331 A | 9/1911 | Wright | |
| 1,004,624 A | 10/1911 | Brann | |

(Continued)

FOREIGN PATENT DOCUMENTS

| | | |
|---|---|---|
| CN | 113193965 B | 10/2021 |
| IN | 1381KOL2007 | 4/2009 |

(Continued)

OTHER PUBLICATIONS

Dobbins et al. "Creating Human Digital Memories for a Richer Recall of Life Experiences" 2013 10th IEEE Internaional Conference on Networking, Sensing and Control, pp. 246-251 (Year: 2013).*

(Continued)

*Primary Examiner* — John W Hayes
*Assistant Examiner* — Yingying Zhou
(74) *Attorney, Agent, or Firm* — Esplin & Associates, PC

(57) ABSTRACT

Systems and methods to compile an experience summary based on real-world experiences are described herein. Exemplary implementations: receive authentication information for a user at a location of one or more real-world experiences; determine whether the authentication information is valid; determine, responsive to determination that the authentication information is valid, a set of digital assets that are associated with an address included in a digital wallet of the user based on transactions recorded on a decentralized ledger; determine the sets of content correlated the individual digital assets of the set; determine the one or more real-world experiences of the user, wherein individual real-world experiences correspond with content updates to the content that are of the content types; and update the sets of content correlated to the individual digital assets of the set in the electronic storage based on the content updates corresponding to the one or more real-world experiences.

14 Claims, 3 Drawing Sheets

(56) References Cited

U.S. PATENT DOCUMENTS

| | | |
|---|---|---|
| 5,299,291 A | 3/1994 | Ruetz |
| 5,766,077 A | 6/1998 | Hongo |
| 6,007,338 A | 12/1999 | Dinunzio |
| 6,053,815 A | 4/2000 | Hara |
| 6,200,138 B1 | 3/2001 | Ando |
| 6,691,032 B1 | 2/2004 | Irish et al. |
| 7,081,033 B1 | 7/2006 | Mawle |
| 7,266,847 B2 | 9/2007 | Pauker |
| 7,739,371 B2 | 6/2010 | Ikegaya et al. |
| 7,837,544 B2 | 11/2010 | Tipping |
| 8,078,163 B2 | 12/2011 | Lemond |
| 8,190,295 B1 | 5/2012 | Garretson |
| 8,758,126 B2 | 6/2014 | Bavitz |
| 8,762,227 B1 | 6/2014 | Fox |
| 8,831,228 B1 | 9/2014 | Agrawal |
| 8,882,595 B2 | 11/2014 | Chowdhary |
| 8,894,462 B2 | 11/2014 | Leyland |
| 8,941,690 B2 | 1/2015 | Seder |
| 8,948,541 B2 | 2/2015 | Neville |
| 8,988,465 B2 | 3/2015 | Baron |
| 9,007,400 B2 | 4/2015 | Takahashi |
| 9,008,310 B2 | 4/2015 | Nelson |
| 9,266,018 B2 | 2/2016 | Story |
| 9,293,042 B1 | 3/2016 | Wasserman |
| 9,327,189 B2 | 5/2016 | Bavitz |
| 9,361,730 B2 | 6/2016 | Keating |
| 9,467,515 B1 | 10/2016 | Penilla |
| 9,610,510 B2 | 4/2017 | Comploi |
| 9,643,086 B2 | 5/2017 | Tipping |
| 9,669,302 B2 | 6/2017 | Park |
| 9,674,361 B2 | 6/2017 | Ristock |
| 9,715,764 B2 | 7/2017 | Alaniz |
| 9,744,448 B2 | 8/2017 | Mullen |
| 9,814,991 B2 | 11/2017 | Van Winkle |
| 9,818,228 B2 * | 11/2017 | Lanier ............... H04W 12/06 |
| 9,821,920 B2 | 11/2017 | Cole |
| 9,922,466 B2 | 3/2018 | Donnelly |
| 10,019,070 B2 | 7/2018 | Szczerba |
| 10,025,431 B2 | 7/2018 | Li |
| 10,043,316 B2 | 8/2018 | Donnelly |
| 10,043,999 B2 | 8/2018 | Senoo |
| 10,045,147 B2 | 8/2018 | Dickow |
| 10,046,241 B1 | 8/2018 | Krosky |
| 10,059,347 B2 | 8/2018 | Thieberger-Navon |
| 10,123,155 B2 | 11/2018 | Grover |
| 10,140,464 B2 | 11/2018 | Lebeck |
| 10,162,998 B2 | 12/2018 | Park |
| 10,186,065 B2 | 1/2019 | Anderson |
| 10,310,600 B2 | 6/2019 | Hong |
| 10,339,711 B2 | 7/2019 | Ng-Thow-Hing |
| 10,366,290 B2 | 7/2019 | Wang |
| 10,376,776 B2 | 8/2019 | Lowe |
| 10,423,999 B1 | 9/2019 | Doctor |
| 10,482,669 B2 | 11/2019 | Rober |
| 10,501,053 B2 | 12/2019 | Tokunaga |
| 10,506,092 B1 | 12/2019 | Stephenson |
| 10,572,123 B2 | 2/2020 | Penilla |
| 10,585,471 B2 | 3/2020 | Reichow |
| 10,589,625 B1 | 3/2020 | Goslin |
| 10,639,557 B2 | 5/2020 | Hake |
| 10,785,621 B1 | 9/2020 | Drake |
| 10,841,632 B2 | 11/2020 | Chao |
| 10,969,748 B1 | 4/2021 | Goslin |
| 10,970,560 B2 | 4/2021 | Khalfan |
| 11,076,276 B1 | 7/2021 | Nocon |
| 11,228,436 B1 | 1/2022 | Foley |
| 11,251,978 B2 | 2/2022 | Ingraham |
| 11,369,878 B1 | 6/2022 | Koch |
| 11,605,062 B2 * | 3/2023 | Prakash ............ G06Q 20/3672 |
| 2001/0025287 A1 * | 9/2001 | Okabe ................ G06Q 10/10 |
| | | 715/205 |
| 2003/0027636 A1 | 2/2003 | Covannon |
| 2003/0104824 A1 | 6/2003 | Hale |
| 2003/0130031 A1 | 7/2003 | Yoshida |
| 2004/0059922 A1 | 3/2004 | Harris |
| 2005/0021192 A1 | 1/2005 | Takafuji |
| 2005/0059483 A1 | 3/2005 | Borge |
| 2005/0144091 A1 * | 6/2005 | Harper ............... G06Q 30/0601 |
| | | 705/27.1 |
| 2006/0052153 A1 | 3/2006 | Vlazny |
| 2006/0143270 A1 | 6/2006 | Wodtke |
| 2006/0224456 A1 | 10/2006 | Walker |
| 2006/0277100 A1 | 12/2006 | Parham |
| 2007/0060233 A1 | 3/2007 | Liccardo |
| 2007/0087834 A1 | 4/2007 | Moser |
| 2007/0093299 A1 | 4/2007 | Bergeron |
| 2007/0139671 A1 | 6/2007 | Stevens |
| 2007/0197275 A1 | 8/2007 | Gagner |
| 2007/0206023 A1 | 9/2007 | Street |
| 2008/0091782 A1 | 4/2008 | Jakobson |
| 2008/0105751 A1 | 5/2008 | Landau |
| 2008/0148067 A1 | 6/2008 | Sitrick |
| 2008/0200244 A1 | 8/2008 | Rowe |
| 2008/0309010 A1 | 12/2008 | Bowling |
| 2008/0311983 A1 | 12/2008 | Koempel |
| 2009/0069084 A1 | 3/2009 | Reece |
| 2009/0079705 A1 | 3/2009 | Sizelove |
| 2009/0137323 A1 | 5/2009 | Fiegener |
| 2009/0176566 A1 | 7/2009 | Kelly |
| 2009/0313358 A1 | 12/2009 | Shepherd |
| 2010/0033427 A1 | 2/2010 | Marks |
| 2010/0093421 A1 | 4/2010 | Nyman |
| 2010/0098092 A1 | 4/2010 | Luo |
| 2010/0130296 A1 | 5/2010 | Ackley |
| 2010/0182340 A1 | 7/2010 | Bachelder |
| 2010/0268661 A1 | 10/2010 | Levy |
| 2010/0324984 A1 | 12/2010 | Pelto |
| 2010/0331721 A1 | 12/2010 | Epley |
| 2011/0098092 A1 | 4/2011 | Reiche, III |
| 2011/0183754 A1 | 7/2011 | Alghamdi |
| 2011/0216948 A1 | 9/2011 | Yalla |
| 2012/0089275 A1 | 4/2012 | Yao-Chang |
| 2012/0142415 A1 | 6/2012 | Lindsay |
| 2012/0256945 A1 | 10/2012 | Kidron |
| 2012/0264518 A1 | 10/2012 | Rouille |
| 2012/0289122 A1 | 11/2012 | Elliott |
| 2012/0295703 A1 | 11/2012 | Reiche |
| 2012/0295704 A1 | 11/2012 | Reiche |
| 2013/0030645 A1 | 1/2013 | Divine |
| 2013/0083003 A1 | 4/2013 | Perez |
| 2013/0083061 A1 | 4/2013 | Mishra |
| 2013/0157607 A1 | 6/2013 | Paek |
| 2013/0166147 A1 | 6/2013 | Chudzinski |
| 2013/0274024 A1 | 10/2013 | Geylik |
| 2013/0296058 A1 | 11/2013 | Leyland |
| 2014/0067208 A1 | 3/2014 | Klappert |
| 2014/0100020 A1 | 4/2014 | Carroll |
| 2014/0100029 A1 | 4/2014 | Reiche |
| 2014/0128144 A1 | 5/2014 | Bavitz |
| 2014/0128145 A1 | 5/2014 | Hwang |
| 2014/0129640 A1 * | 5/2014 | Ogawa ................ G06Q 10/10 |
| | | 709/204 |
| 2014/0162785 A1 | 6/2014 | Reiche |
| 2014/0163771 A1 | 6/2014 | Demeniuk |
| 2014/0189017 A1 | 7/2014 | Prakash |
| 2014/0201004 A1 | 7/2014 | Parundekar |
| 2014/0274313 A1 | 9/2014 | Bala |
| 2014/0295963 A1 | 10/2014 | Ishikawa |
| 2014/0342790 A1 | 11/2014 | Kim |
| 2015/0003609 A1 | 1/2015 | Nelson |
| 2015/0024852 A1 | 1/2015 | Pacey |
| 2015/0065237 A1 | 3/2015 | Hohn |
| 2015/0080125 A1 | 3/2015 | Andre |
| 2015/0097860 A1 | 4/2015 | Alaniz |
| 2015/0097864 A1 | 4/2015 | Alaniz |
| 2015/0100179 A1 | 4/2015 | Alaniz |
| 2015/0134371 A1 * | 5/2015 | Shivakumar .......... G06F 16/954 |
| | | 705/5 |
| 2015/0145671 A1 | 5/2015 | Cohen |
| 2015/0174479 A1 | 6/2015 | Reiche |
| 2015/0202962 A1 | 7/2015 | Habashima |
| 2015/0269780 A1 | 9/2015 | Herman |
| 2015/0294505 A1 | 10/2015 | Atsmon |
| 2015/0339910 A1 | 11/2015 | Stenzler |

(56) References Cited

U.S. PATENT DOCUMENTS

| | | | |
|---|---|---|---|
| 2015/0346722 A1 | 12/2015 | Herz | |
| 2015/0363092 A1 | 12/2015 | Morton | |
| 2016/0005070 A1 | 1/2016 | Burr | |
| 2016/0042607 A1 | 2/2016 | Mccoy | |
| 2016/0071397 A1* | 3/2016 | Logan | G07C 9/00 |
| | | | 340/687 |
| 2016/0096114 A1 | 4/2016 | Van Winkle | |
| 2016/0189444 A1 | 6/2016 | Madhok | |
| 2016/0199730 A1 | 7/2016 | Olson | |
| 2016/0206955 A1 | 7/2016 | Goslin | |
| 2016/0206957 A1 | 7/2016 | Goslin | |
| 2016/0216854 A1 | 7/2016 | Mcclellan | |
| 2016/0224939 A1 | 8/2016 | Chen | |
| 2016/0299567 A1 | 10/2016 | Crisler | |
| 2016/0310839 A1 | 10/2016 | Leyland | |
| 2016/0313792 A1 | 10/2016 | Siegel | |
| 2016/0346704 A1 | 12/2016 | Wagner | |
| 2017/0021273 A1 | 1/2017 | Rios | |
| 2017/0021282 A1 | 1/2017 | Comploi | |
| 2017/0045946 A1 | 2/2017 | Smoot | |
| 2017/0050743 A1 | 2/2017 | Cole | |
| 2017/0068311 A1 | 3/2017 | Evans | |
| 2017/0072316 A1 | 3/2017 | Finfter | |
| 2017/0078621 A1 | 3/2017 | Sahay | |
| 2017/0103571 A1 | 4/2017 | Beaurepaire | |
| 2017/0106288 A1 | 4/2017 | Reiche | |
| 2017/0132334 A1 | 5/2017 | Levinson | |
| 2017/0154024 A1 | 6/2017 | Subramanya | |
| 2017/0158023 A1 | 6/2017 | Stevanovic | |
| 2017/0166221 A1 | 6/2017 | Osterman | |
| 2017/0203205 A1 | 7/2017 | Nelson | |
| 2017/0236130 A1* | 8/2017 | Kee | G06F 16/93 |
| | | | 705/7.26 |
| 2017/0236328 A1 | 8/2017 | Eatedali | |
| 2017/0253252 A1 | 9/2017 | Donnelly | |
| 2017/0270502 A1 | 9/2017 | Finbow | |
| 2017/0300999 A1 | 10/2017 | Wilkinson | |
| 2017/0330034 A1 | 11/2017 | Wang | |
| 2017/0344754 A1 | 11/2017 | Kumar | |
| 2017/0352185 A1 | 12/2017 | Bonilla Acevedo | |
| 2018/0008894 A1 | 1/2018 | Sack | |
| 2018/0011988 A1 | 1/2018 | Ziegler | |
| 2018/0040162 A1 | 2/2018 | Donnelly | |
| 2018/0040163 A1 | 2/2018 | Donnelly | |
| 2018/0043272 A1 | 2/2018 | Van Winkle | |
| 2018/0089900 A1 | 3/2018 | Rober | |
| 2018/0089901 A1 | 3/2018 | Rober | |
| 2018/0096501 A1 | 4/2018 | Anderson | |
| 2018/0181412 A1 | 6/2018 | Paratey | |
| 2018/0231973 A1 | 8/2018 | Mattingly | |
| 2018/0247352 A1 | 8/2018 | Rogers | |
| 2018/0247364 A1 | 8/2018 | Nakadai | |
| 2018/0342001 A1 | 11/2018 | Chavarria | |
| 2018/0369702 A1 | 12/2018 | Hake | |
| 2019/0001987 A1 | 1/2019 | Kim | |
| 2019/0014070 A1 | 1/2019 | Mertvetsov | |
| 2019/0047498 A1 | 2/2019 | Alcaidinho | |
| 2019/0065970 A1 | 2/2019 | Bonutti | |
| 2019/0075437 A1 | 3/2019 | Shaikh | |
| 2019/0101976 A1 | 4/2019 | Reichow | |
| 2019/0157607 A1 | 5/2019 | Kim | |
| 2019/0220674 A1 | 7/2019 | Khalfan | |
| 2019/0299105 A1 | 10/2019 | Knight | |
| 2019/0385213 A1 | 12/2019 | Pande | |
| 2020/0005284 A1 | 1/2020 | Madhu | |
| 2020/0053400 A1 | 2/2020 | Chao | |
| 2020/0074181 A1 | 3/2020 | Chang | |
| 2020/0151768 A1 | 5/2020 | Dekeyser | |
| 2020/0163616 A1 | 5/2020 | Sakaya | |
| 2020/0193163 A1 | 6/2020 | Chang | |
| 2020/0376387 A1* | 12/2020 | Packin | H04L 9/0637 |
| 2021/0016184 A1 | 1/2021 | Kalama | |
| 2021/0056762 A1* | 2/2021 | Robbe | G06F 16/2282 |
| 2021/0217026 A1 | 7/2021 | Hassani | |
| 2021/0256070 A1 | 8/2021 | Bao | |
| 2021/0284088 A1 | 9/2021 | Yamaguchi | |
| 2021/0287195 A1 | 9/2021 | Prakash | |
| 2022/0004600 A1 | 1/2022 | Bangole | |
| 2022/0069996 A1 | 3/2022 | Xue | |
| 2022/0148268 A1 | 5/2022 | Yilanci | |
| 2022/0248072 A1* | 8/2022 | Gupta | H04L 63/0807 |
| 2022/0258059 A1 | 8/2022 | Murcin | |
| 2022/0266148 A1* | 8/2022 | Koch | A63F 13/69 |
| 2023/0036724 A1 | 2/2023 | Khalfan | |
| 2023/0142101 A1* | 5/2023 | Hirasawa | G16H 30/40 |
| | | | 345/629 |
| 2024/0152909 A1 | 5/2024 | Khalfan | |

FOREIGN PATENT DOCUMENTS

| | | |
|---|---|---|
| JP | 2019065430 | 4/2019 |
| WO | 2007101785 A1 | 9/2007 |
| WO | 2018128946 A1 | 7/2018 |

OTHER PUBLICATIONS

Olsson et al. "User-Centered Design of a Mobile Application for Sharing Life Memories," Proceedings of the 4th international conference on mobile technology, applications, and systems and the 1st international symposium on Computer human interaction in mobile technology—Mobility '07, pp. 524-531, (Year: 2007).*

"Battle Circuit", Capcom, available at «https://web.archive.org/web/20000111073021/http://www.capcom.co.jp/newproducts/arcade/battle/bs-top. html» (Orig in al Japanese web page followed by English translation), 4 pages.

"Dynamic NFTs for each player in the 2022 NBA Playoffs"; The Association NFT; https://theassociationnft.com/#/ ; 2022 (5 pages).

"Sun CriesSun Cries", http://web.archive.org, Mar. 9, 2012 (Mar. 9, 2012), XP055152538, Retrieved from the Internet: URL: http://web.archive.org/web/20120309212642/http://www.suncries.com/skylanders-hacking [retrieved on Nov. 12, 2014] (8 pgs).

"Video Game/ Battle Circuit", TV Tropes, available at «https://web.archive.org/web/20150114005112/http://tvtropes.org/pmwiki/pmwiki.php/VideoGameBattleCircuit» (4 pages).

"What is a dynamic NFT"; Chainlink; https://blog.chain.link/what-is-a-dynamic-nft/ ; Apr. 7, 2022 (10 pages).

Adam Hartley, 5 Predictions for the Future of in-Car Entertainment, Apr. 9, 2019 [https://360.here.com/5-predictions-for-the-future-of-in-car-leisure-entertainment], (5 pages).

Apple (Developing Wireless CarPlay System, https://developer.apple.com/videos/play/wwdc2017/717/WWDC 2017, video and slide). (Year. 2017).

Dagamant, 'Skylanders Hacking', Retrieved from the Internet http://web.archive.ora/web/20120309212642/http://www.suncries.com/skvlaners-hacking Feb. 27, 2012, XP055152538, 8 pages.

Extended European Search Report issued in European Patent Application No. 14175300.4, dated Nov. 19, 2014. (6 pgs).

Google search "Iphone Figurine" (Year: 2020), 1 page.

Holoride, "Adding Thrill to Every Ride" Conceptual Litepaper V.2.1; https://maiarlaunchpad.com/holoride_Litepaper_V2.1_Nov21.pdf ; Nov. 2021 (26 pages).

https://maiarlaunchpad.com/holoride_Litepaper_V2.1_Nov21.pdf, pp. 1-26.

https://www.ibm.com/downloads/cas/M8AOGADZ, 2018, pp. 1-8. IBM Institute for Business Value, "Blockchain for mobility services" https://www.ibm.com/downloads/cas/M8AOGADZ ; Jan. 2018 (8 pages).

Kloster, Benjamin, 'Wanted: Encryption Scheme for Copy Protection Purposes', Retrieved from the Internet http://stackoverflow.com/questions/14529732/wanted-encryption-scheme-for-copy-protection-purposes, Jan. 25, 2013, XP055152568, 2 pages.

Lambros Sarakis, et al., Technological Educational Institute of Sterea Ellada; Hellenic Open University; Synelixis Solutions Ltd., Providing Entertainment Applications in VANET Environments, Mar. 2, 2016 [https://ieeexplore.ieee.org/ document/7422403] (8 pages).

(56) References Cited

OTHER PUBLICATIONS

NPX "Software-Apple-Carplay: Software Technology for CarPlay", https://www.nxp.com/design/software/embedded-software/software-technology-for-carplay:SOFTWARE-APPLE-CARPLAY (Year: 2020), 3 pages.

Raman Mehta, IDG Communications, Inc., Augmented Reality—Next Frontier for Competitive Advantage, Feb. 14, 2017 [https://www.cio.com/article/3169685/augmented-reality-next-frontier-for-competitive-advantage.html], (5 pages).

Lucas Caciolo; "Decentralized theme parks promise kids virtual prizes to earn as they learn"; forkast; Jun. 29, 2021 (4 pages).

Cory Himel; "Developers can use gamification"; Gigster, Mar. 16, 2022 (5 pages).

"Dubai parks, etisalat to create an integrated smart theme park"; Gulf News; Jan. 13, 2016 (2 pages).

Adelyn Zhou; "The Next Wave of NFTs will be Dynamic"; Nasdaq; Mar. 29, 2021 (8 pages).

Charlotte Coates; "NFTs: the next big thing for the attractions industry"; Sep. 21, 2021 (14 pages).

"The Aeternals: New NFT and Interactive Technology"; Business Wire; Mar. 2, 2022 (3 pages).

Manzoor et al, "Scavenger Hunt: Utilization of Blockchain and IoT for a Location-Based Game," 2020, IEEE. Retrieved from <https://ieeexplore.ieee.org/stamp/stamp.jsp?tp=&arnumber=9253568&tag=1>c on Oct. 18, 2024. (Year: 2020).

\* cited by examiner

SYSTEMS AND METHODS TO COMPILATE AN EXPERIENCE SUMMARY BASED ON REAL-WORLD EXPERIENCES

CROSS-REFERENCE TO RELATED APPLICATIONS

This application claims priority benefit of the U.S. Provisional Patent Application No. 63/231,978 titled, "SYSTEMS AND METHODS TO COMPILATE AN EXPERIENCE SUMMARY BASED ON REAL-WORLD EXPERIENCES," filed on Aug. 11, 2021. The subject matter of this related application is hereby incorporated herein by reference.

FIELD OF THE DISCLOSURE

The present disclosure relates to systems and methods to compilate an experience summary based on real-world experiences.

BACKGROUND

Users may frequently visit particular places, such as stadiums, theaters, performance venues, attractions, and amusement parks. The users may be limited to personal memories and/or physical memories (souvenirs) they obtain themselves such as photos, videos, and physical items. Obtaining the physical memories may be restricted by particular places and/or by the users themselves. Furthermore, the users may own a plurality of digital assets, such as non-fungible tokens, that are correlated with content that are infrequently updated and/or infrequently accessed subsequent to obtainment of the digital assets.

SUMMARY OF THE INVENTION

System(s) and method(s) to compilate an experience summary based on real-world experiences are described herein. The digital assets may be maintained by decentralized ledger(s), thereby recording ownership of the digital assets and entities they are correlated with such as sets of content. The sets of content correlated with the digital assets may be updated based on and responsive to particular real-world experiences of the user. The updates may be a method of providing memories or souvenirs for the real-world experiences that the user experienced. As such, the sets of content may illustrate the real-world experiences of the user to later view, modify, share, sell, and/or transfer. The ownership of the digital assets may be immutable unless the user/owner of the digital assets initiates a transaction to change the ownership and such transaction is recorded on the decentralized ledger. Thus, only the user that owns the digital assets correlated with various unique content that is based on the real-world experiences may control the content, access thereof as frequently as desired, and/or ownership thereof.

The system may include one or more hardware processors configured by machine-readable instructions. The machine-readable instructions may include one or more instruction components. The instruction components may include computer program components. The instruction components may include one or more of an authenticating component, a token determination component, an experience determination component, a content updating component, and/or other instruction components.

The authenticating component may be configured to receive authentication information for a user at a location of one or more real-world experiences. The authenticating component may be configured to determine whether the authentication information is valid.

The token determination component may be configured to determine, responsive to determination that the authentication information is valid, a set of digital assets that are associated with an address included in a digital wallet of the user based on transactions recorded on a decentralized ledger such that the user owns the set of the digital assets. The transactions may include the address and the set of the digital assets. The digital wallet may include a private key that provides the user with access to consideration sent to the address. The token determination component may be configured to determine sets of content correlated to the individual digital assets of the set. The sets of content may be stored in electronic storage. The individual digital assets may be associated with content types such that the sets of content correlated to the individual digital assets are of the content types. For example, the content types may include a purchase, an obtainment, a ride attraction, a consumption, a viewing, a photo/video, and/or other content types.

The experience determination component may be configured to determine the one or more real-world experiences of the user. Individual real-world experiences may correspond with content updates to the content that are of the content types. The individual real-world experiences may be a type of experience. Types of experiences may include a purchase, an obtainment, a ride attraction, a consumption, a viewing, a photo/video, and/or other types of experience, similar to the content types.

The content updating component may be configured to update the sets of content correlated to the individual digital assets of the set in the electronic storage based on the content updates corresponding to the one or more real-world experiences.

DETAILED DESCRIPTION

Figure 1:
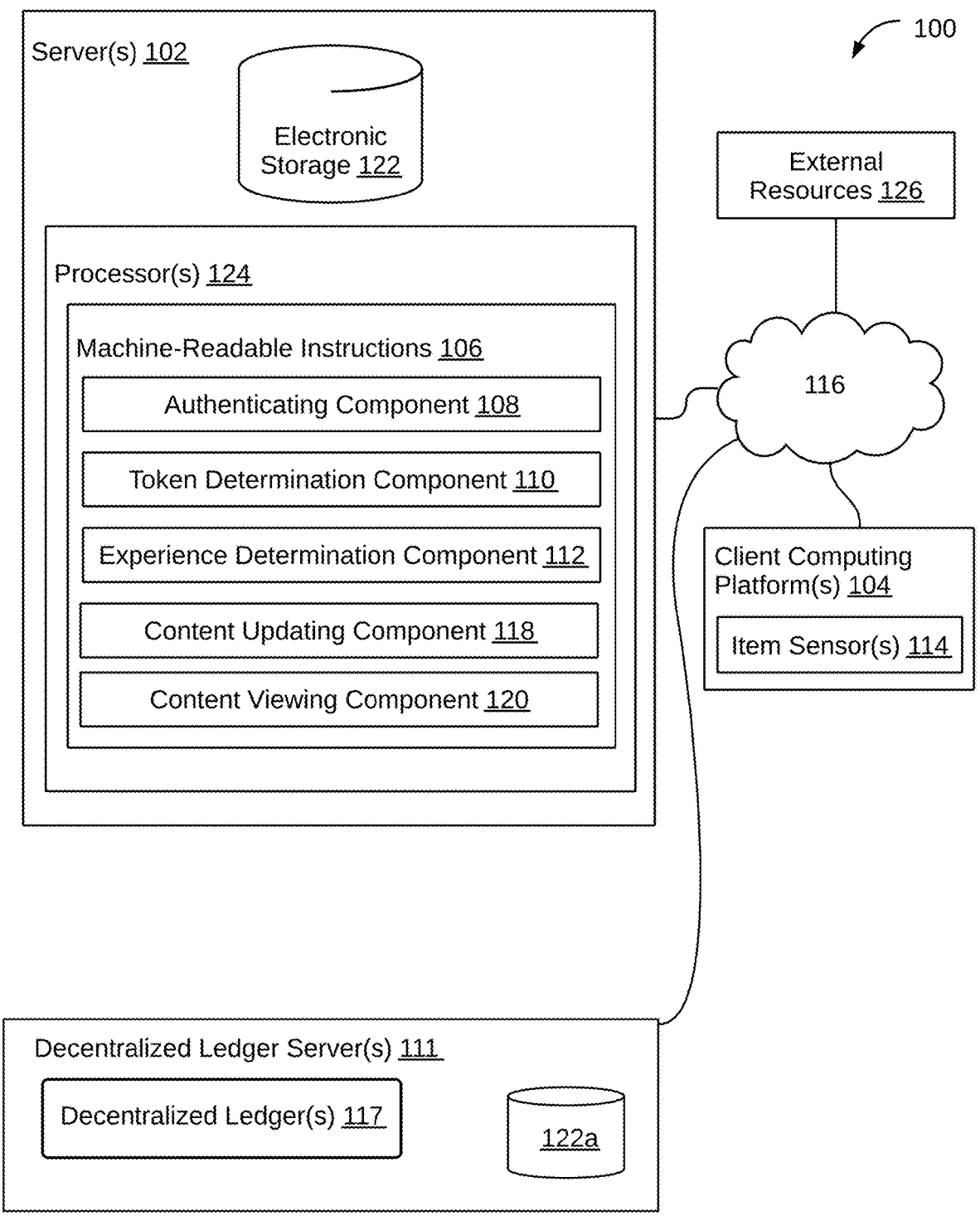
FIG. 1 illustrates a system configured to compilate an experience summary based on real-world experiences, in accordance with one or more implementations.

FIG. 1 illustrates a system 100 configured to compilate an experience summary based on real-world experiences, in accordance with one or more implementations. The experience summary may be a set of content that represents the real-world experiences of a user. The set of content may be accessed subsequent to the real-world experiences by the user or others to review. In some implementations, system 100 may include one or more servers 102, one or more decentralized ledger server(s) 111, one or more item sensors 114, and/or other components. Electronic storage 122a may be similar to electronic storage 122 as described elsewhere in this disclosure, though included in decentralized ledger server(s) 111 as depicted in FIG. 1.

As used herein, the term "digital asset" may refer to an identifier tracked on one or more permanent registries. The digital assets may be uniquely identified and/or uniquely identifiable. As used herein, rights pertaining to digital assets may be tracked, recorded, and/or otherwise registered on one or more permanent registries. As such, an individual digital asset may be a registry-tracked digital asset. The identifier may include a numeric code, an alphabetical code, an alphanumeric code, and/or other unique identifier.

Individual digital assets may be correlated with another entity (which may be referred to as a "correlated entity") by virtue of technology provided and/or supported by the one or more permanent registries on which the rights pertaining to the individual digital assets are tracked (including but not limited to smart contracts and/or other executable code on the one or more permanent registries). Accordingly, rights pertaining to a digital asset may correlate to the provision of one or more rights (e.g., accessibility) with respect to the correlated entity (e.g., control and/or other accessibility). Transactions involving a digital asset recorded on a permanent registry may correlate to certain transactions (or modifications) of the correlated entity, and/or vice versa.

Various types and/or combinations of correlated entities are envisioned within the scope of this disclosure, including but not limited to physical and/or virtual objects, content, items, rights, memberships, grants, etc. The use of the singular "entity" or "correlated entity" is not intended to be limiting, as multiple different objects, content, items, rights, memberships, grants, etc. may be correlated to a single digital asset. By way of non-limiting example, a correlated entity may be a physical item (e.g., an accessory from a gift shop), a subscription to certain media content, content described herein, and so forth. In some implementations, the correlated entity may refer to any item or object related to art and entertainment for which a user may use, own, sell, trade, loan, destroy, and/or otherwise effectuate a change of ownership, access, or control (including exchanges through challenges).

A digital asset may be fungible if it is functionally and/or physically indistinguishable from another digital asset. A digital asset may be non-fungible if it is unique, or one-of-a-kind. For example, a specific individual may be non-fungible. A digital asset may be semi-fungible if there is a set of a limited number of similar but distinguishable digital assets. For example, a limited amount of images of a sports team for a particular year may be semi-fungible. For example, a digital ticket to a show, concert, exhibition, and/or other event may be semi-fungible. The semi-fungible digital assets are considered as unique, "not fungible", or non-fungible digital assets. In some implementations, the digital assets may include non-fungible tokens, fungible tokens, semi-fungible tokens, and/or other digital assets.

Decentralized ledger server(s) 111 may be used to implement one or more decentralized ledger(s) 117. The terms "permanent registries" and "decentralized ledgers" may be used interchangeably herein. In some implementations, one or more decentralized ledger(s) 117 may be decentralized and/or immutable registries. In some implementations, decentralized ledger(s) 117 may be one or more databases on which rights pertaining to the individual digital assets are tracked and/or recorded. In some implementations, decentralized ledger(s) 117 may be maintained by distributed computing platforms (not shown in FIG. 1). In some implementations, a distributed computing platform may be implemented by a set of client computing platforms and/or servers (including, for example, one or more decentralized ledger server(s) 111). In some implementations, client computing platform(s) 104 may be the distributed platform(s). The distributed computing platform may support a virtual machine (not shown in FIG. 1). The distributed computing platform and/or the virtual machine may form a runtime environment for smart contracts and/or other executable code. A distributed computing platform may include electronic storage configured to store part or all of decentralized ledger(s) 117. The smart contracts may be stored on decentralized ledger(s) 117 and/or another decentralized ledger. In some implementations, the distributed computing platform may be the EOSIO platform. In some implementations, the distributed computing platform may be similar to or based on the EOSIO platform. In some implementations, the distributed computing platform may be Ethereum. In some implementations, the distributed computing platform may be similar to or based on Ethereum. In some implementations, the virtual machine may be a decentralized virtual machine.

In some implementations, at least one of the decentralized ledger(s) 117 implemented by decentralized ledger server(s) 111 is a private permissioned decentralized ledger. The private permissioned decentralized ledger may be configured to record information and/or track addresses (e.g., corresponding to digital wallets, smart contracts, etc.). The recorded information may pertain to one or more digital assets recorded on decentralized ledger(s) 117. The recorded information may include ownership of the digital assets and/or other assets. For example, ownership rights and/or other rights may be modified. In some implementations, a digital asset may be removed from one decentralized ledger and added or recorded on another decentralized ledger. In some implementations, at least one of the decentralized ledger(s) 117 implemented by decentralized ledger server(s) 111 is a public decentralized ledger. The public decentralized ledger may be configured to be part of either EOSIO mainnet, Ethereum mainnet, Ethereum 1.5, Ethereum 2.0, a derivative of Ethereum 2.0 that is configured to perform transactions of Ether (ETH) between accounts, or a derivative of EOSIO that is configured to perform transactions of EOS between different accounts.

Elements of decentralized ledger(s) 117 ledger may be grouped together in units that are referred to as blocks. For example, an individual block may include one or more digital assets and/or one or more transactions related to the one or more digital assets. For example, an individual block may be linked to one or more other individual blocks. Individual blocks may be linked or chained together to form a structure of blocks and/or a hierarchy of blocks, such as, e.g., a chain of blocks. An individual block may include one or more assets (e.g., digital assets), one or more transactions, and/or other information.

In some implementations, an individual decentralized ledger server(s) 111 may be dedicated to a particular node of a decentralized ledger(s) 117. Typically, different nodes are included in (or implemented by, or hosted by) different servers or different computer systems to increase the safety and security of transactions on a decentralized ledger and/or blockchain. The consensus protocol used for a particular blockchain will be harder to falsify or circumvent when the different nodes are in different geographical locations, on different types of computing platforms, and/or are otherwise distributed and diverse.

In some implementations, one or more decentralized ledger(s) 117 implemented by decentralized ledger server(s) 111 may be publicly accessible. In some implementations, one or more decentralized ledger(s) 117 implemented by decentralized ledger server(s) 111 may be private and/or permissioned. In some implementations, one or more decentralized ledger(s) 117 implemented by decentralized ledger server(s) 111 may be append-only. In some implementations, existing blocks and/or nodes of one or more decentralized ledger(s) 117 implemented by decentralized ledger server(s) 111 can substantially not be altered or deleted, unless multiple copies are altered. This is unlikely to happen provided that the multiple copies stored on different computing platforms, e.g., in different geographical locations, are in accordance with the relevant consensus protocol(s). Decentralized ledger(s) 117 may be replicated on multiple computing platforms, preferably in multiple different geographical locations. Additionally, individual blocks and/or nodes may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, individual nodes, transactions, and/or assets may be digitally signed in a manner that proves integrity and/or prevents tampering, e.g., by providing authentication, as well as repudiation.

Server(s) 102 may include electronic storage 122, processor(s) 124, machine-readable instructions 106, and/or other components. In some implementations, server(s) 102 may be configured to communicate with one or more client computing platforms 104 according to a client/server architecture and/or other architectures. Individual client computing platforms 104 may be connected with, coupled with, or otherwise associated with a location. Client computing platform(s) 104 may be configured to communicate with other client computing platforms 104 via server(s) 102 and/or according to a peer-to-peer architecture and/or other architectures. In some implementations, users may access system 100 via client computing platform(s) 104. In some implementations, decentralized ledger server(s) 111 may be configured to communicate with one or more of server(s) 102, client computing platform(s) 104, and/or other entities and/or components, e.g., through one or more network(s) 116.

Electronic storage 122 is configured to store individual sets of content correlated with individual digital assets. As used herein, the term "set" may include a set of one or a set of multiple given elements. For example, a set of digital assets may include one digital asset or more than one digital assets. As another example, a set of content may include one piece of content, or multiple pieces of content. As previously described, a digital asset is an identifier. Thus, individual ones of the content may be associated with and identified by identifiers which are the digital assets that the content is correlated to. In some implementations, the digital assets and its correlated content may be associated with other identifiers that facilitate searching and obtaining the content from electronic storage 122 and/or other storage such as electronic storage 122a. The other identifiers may include one or more of a keyword, a date (e.g., a start date or an end date), a time (e.g., a start time or an end time), a period of time, a location, a name of a digital asset, and/or other identifiers. The other identifiers may be defined by users that hold/own such digital assets and/or may be automatically defined based on occurrence of real-world experiences described herein. For example, the keywords may be related to the real-world experiences, the date and the time may be when the real-world experience occurred, the location may be where the real-world experiences occurred (e.g., address, location name, ride attraction, etc.), and/or the name of the digital assets may be a personalized name by the users. The period of time may be an amount of minutes, hours, days, weeks, months, from the start date and/or the start time to the end date and/or the end time.

The content may include one or more of an animation, a photo, a general photo, a recorded video, a general video, a sound bite of an audio file, the audio file, a visual presentation theme, an audio presentation theme, a description, a special effect, a graphic image file, a signature of notoriety, and/or other content. Individual content or multiple ones of the content may represent individual real-world experiences described herein. The audio file may include music, audio-books, podcasts, essential information (e.g., safety), sound effects, and/or other audio files. The visual presentation theme may include colors, font, graphic animations related to a particular theme (e.g., a movie, a character, a show, etc.) for visual ones of the content. The audio presentation theme may include particular music genres, voiceover voices, sound effects, and/or other audio related to the particular theme for audible ones of the content. The description may describe the real-world experience, concisely or extensively. The special effects may include sound effects, animation effects, specialized fonts, and/or other special effects. Thus, the content stored may be a visual, audible, and/or textual record or documentation of the real-world experiences the user experienced collectively and/or over a period of time.

Individual client computing platforms 104 may be associated with and/or located at particular locations. In some implementations, the locations may be static or dynamic. The static locations may include ride attractions, stores, restaurants, photo spots, viewpoints, and/or other locations that are permanent. The dynamic locations may be locations that frequently change such as food carts, vendors (e.g., for balloons), tours, and/or other dynamic locations. The photo spots may refer to locations where photos are ideal, encouraged to be taken at, and/or are popular. The viewpoints may refer to locations where a view (e.g., of a city, a park, a body of water, etc.) is impressive, notable, or otherwise memorable. In some implementations, the locations may be located in a place that users visit, such as an amusement park, a stadium, a festival outdoor grounds, a racetrack, a park, a convention center, a performance venue, and/or other places. In some implementations, the locations may further include an entrance and/or an exit to the place.

The individual locations may be associated with one or more real-world experiences. The real-world experiences may include attending events, attending themed days/nights, attending shows, consuming and/or purchasing food, consuming and/or purchasing beverages, meeting and/or capturing photos and/or videos with characters, riding ride attractions, viewing sights, purchasing and/or obtaining consumer items, and/or other real-world experiences that the users may experience, view, encounter, perceive, enjoy, and/or dislike. For example, the events may include concerts, plays, sports games, festivals, tastings, weddings, ceremonies, graduations, holidays (e.g., Halloween, Easter, Christmas, etc.), tree lightings, and/or other events. The themed days/nights may be holiday themed, character themed, movie themed, era themed, and/or other themes. The shows may include light shows, firework shows, parades, music shows, dance shows, character battles, character performances, and/or other shows. The food may include dishes such as entrees, appetizers, desserts, presentations thereof, and/or other dishes the users may have order, consumed, and/or witnessed being made. The food may also or alternatively include snacks including foods that may be consumed while the user is moving or transporting from one location to another. The beverages may include drinks, specialty drinks, containers holding such drinks and specialty drinks, and/or other beverages.

The characters may be from movies, television shows, animations, plays, musicals, and/or works of art. The ride attractions may be themed as one of the movies, the television shows, the animations, the plays, the musicals, and/or other works of art. The sights may be viewable objects and/or structures such as art in a museum or landmarks. In some implementations, the sights may be viewed at the viewpoints. The consumer items may include balloons, toys, lanyard pins, the food, the beverages, and/or other consumer items the user may possess and/or purchase.

Server(s) 102 may be configured by machine-readable instructions 106. Machine-readable instructions 106 may include one or more instruction components. The instruction components may include computer program components. The instruction components may include one or more of authenticating component 108, token determination component 110, experience determination component 112, content updating component 118, content viewing component 120, and/or other instruction components.

Authenticating component 108 may be configured to receive authentication information for a user. The authentication information may facilitate identity verification of the user. The identity verification of the user may facilitate verification of a digital wallet associated with the user. The digital wallet may include a private key, public key, an address generated based on the public key and a hash function, and/or other information. The private key may provide or authorize the user, or anyone who possesses the private key, with access to consideration sent to the address. The private key may authorize and initiate transactions of the consideration from the address. The consideration, by way of non-limiting example, may include currency, cryptocurrency, digital assets, and/or other consideration. The authentication information may include user input from a personal computing platform (similar to client computing platform 104) associated with the user, output signals based on a physical item associated with the user, biometric information of the user, and/or other authentication information. In some implementations, more than one of the authentication information may be received. In some implementations, one of the authentication information may be received.

The user input may include a passcode, a password, a pass phrase, and/or other user input. The output signals may either convey validity or invalidity of the identity of the user. In some implementations, the output signals may convey a particular passcode, a particular password, a particular pass phrase, a particular identifier (e.g., a user identification number), and/or other information that facilitates identify verification of the user. In some implementations, the particular passcode, the particular password, and/or the particular pass phrase may be the same as the passcode, the password, and/or the pass phrase received as user input.

In some implementations, the physical items may be configured to generate primary output signals. By way of non-limiting example, the physical item may include a personal computing platform (e.g., smartphone, tablet, portable computer, etc.), a watch, a fob, a key card, and/or other physical items. The physical items may include radio frequency identification (RFID) or otherwise be configured to generate the primary output signals, and/or may be configured to present a quick response (QR) code, a barcode, and/or other optical codes. The output signals received by authenticating component 108 are the primary output signals. In some implementations, such output signals may be received by authenticating component 108 upon the physical item being in close proximity to the location. Close proximity of the physical item may include within 5 feet, within 3 feet, within 2 inches, and/or other amount of distance.

In some implementations, the output signals received by authenticating component 108 may be generated by item sensor(s) 114. In some implementations, item sensor(s) 114 may be included in or coupled with client computing platform(s) 104. In some implementations, item sensor(s) 114 may be included in or associated with the individual locations. Item sensor(s) 114 may be configured to receive the primary output signals from the physical item and generate the output signals based on the primary output signals from the physical item. In some implementations, the primary output signals may be received by item sensor(s) 114 upon the physical item entering the location or the physical item being in close proximity of the location and/or item sensor(s) 114. In some implementations, the physical item, such as the fob or the watch, may be included within another object. For example, the object may include a toy (e.g., a figurine, a stuffed animal), a headwear piece, a jewelry piece, and/or other object. In some implementations, item sensor(s) 114 may include an RFID reader, a QR code scanner, a barcode scanner, a near field communication (NFC) chip reader, and/or other item sensor(s) 114. The biometric information may include a fingerprint, a retinal pattern, a hand scan, a face scan, voice, DNA sample, and/or other biometric information. In some implementations, item sensor(s) 114 and/or other sensors may be configured to receive the biometric information from the user. In some implementations, item sensor(s) 114 may be configured to generate secondary output signals representative of the biometric information and transmit the secondary output signals to authenticating component 108. In some implementations, item sensor(s) 114 may be configured to transmit the biometric information to authenticating component 108.

Authenticating component 108 may be configured to determine whether the authentication information is valid or invalid. The authentication information determined as valid may indicate the identity of the user is verified. The authentication information determined as invalid may indicate the identity of the user is unverified. In some implementations, the determination of whether the authentication information is valid or invalid may include comparing the authentication information with access information. The access information may include the passcode, the password, the pass phrase, the particular passcode, the particular password, the particular pass phrase, the biometric information, information identical to the information conveyed by the output signals (e.g., the primary or the secondary output signals), and/or other access information. Comparing the authentication information with the access information may include determining whether the authentication information is the same as the access information, whether a majority of the authentication information is the same as the access information, and/or other techniques to determine whether the authentication information and the access information verify the identity of the user or not.

Token determination component 110 may be configured to determine a set of digital assets that are associated with the address, and included in the digital wallet of the user, based on the transactions recorded on decentralized ledger(s) 117. The determination of the set of the digital assets may be responsive to determination that the authentication information is valid such that the identity of the user is verified. In some implementations, one or more addresses included in the digital wallets may be accessed due to decentralized ledger(s) 117 being publicly accessible. In some implementations, the digital wallet may include or may be associated with the authentication information and/or the access information. Thus, the determination of the set of the digital assets may be based on the authentication information that the digital wallet includes and/or comparing the authentication information to the access information that the digital wallet includes. In some implementations, the addresses included in the digital wallet may be accessed based on the authentication information and/or the access information due to decentralized ledger(s) 117 being private and/or permissioned. The digital wallet may further indicate ownership of one or more other assets.

Token determination component 110 may be configured to determine sets of content correlated to the digital assets in the set. In some implementations, the content may be stored in electronic storage 122a in addition to or alternative to electronic storage 122. In some implementations, the sets of content correlated to the digital assets in the set may be determined based on the identifiers that are the set of the digital assets, and/or the other identifiers. In some implementations, an individual digital asset, and its correlated content stored to electronic storage 122, may be specific to a type of experience, a particular visit to a given place (e.g., amusement park, music festival), or a period of time.

A given real-world experience may be more than one type of experience. The Types of experience may include a purchase (e.g., one or more physical items from a store), an obtainment (e.g., collecting free items), a ride attraction, a consumption (e.g., one or more dishes, snacks, beverages), a viewing (e.g., one or more shows, viewpoints), a photo/video (e.g., with one or more characters, at one or more photo spots), and/or other experience types. For example, a show may always give a free souvenir related to the show. Thus, attending the show may be the viewing type of experience and the obtainment type of experience.

In some implementations, a set of content correlated to a digital asset may be of a content type that is related to or the same as the type of experience. By way of non-limiting illustration, a first digital asset may be specific to the ride attraction experience type, and a set of content correlated to the first digital asset may be a ride attraction content type. For example, the set of content correlated to the first digital asset may include first content related to a first ride attraction (e.g., a general black and white video associated with the first ride attraction) and/or second content related to a second ride attraction.

A digital asset that is specific to the particular visit to the place may be correlated to a set of content that include pieces of content related to multiple ones of the types of experience. That is, a set of content correlated to a second digital asset may be updated based on and responsive to particular real-world experiences of the user determined and described herein such as any of the ride attractions, any food consumed, and any viewings at the place of visit.

A digital asset that is specific to some period of time may be correlated to a set of content related to multiple ones of the types of experience and/or multiple different visits to different places. For example, a third digital asset may be specific to the month of June in year 2020. Thus, the content correlated to the second digital asset and any other real-world experiences related to foods consumed, beverages consumed, events attended, and/or other real-world experiences during June may update a set of content correlated to the third digital asset.

Experience determination component 112 may be configured to determine the one or more real-world experiences of the user. The one or more real-world experiences may be determined subsequent to the authentication information being received and verified at the locations by client computing platform(s) 104 and/or by item sensor(s) 114 at the locations. That is, upon determination that the user is at a given location and their identity is verified, the one or more real-world experiences may be determined to cause appropriate updates to particular sets of content correlated to the digital assets owned by the user in electronic storage 122. In some implementations, a purchase, i.e., one of the real-world experiences, may be determined based on purchase information obtained from client computing platforms 104 associated with a seller or vendor. The purchase information may include an item purchased (e.g., food, beverage, consumer item), a price, the seller or vendor, and/or other purchase information. In some implementations, determining a given real-world experience may include determining whether the given real-world experience is new for the user or reoccurring. The updates to the sets of content correlated to the digital assets may include adding content, removing content, adjusting content, and/or other updates. In some implementations, adjusting the content may include adding, removing, or modifying a text, a font, a text color, a text size, one or more sound effects, a video speed, a video volume, a photo filter, a background color, a background theme, and/or other adjustments to the content. The sets of content may be subsequently viewed by the user to provide their past real-world experiences as a compilation or collection of the content that represents the real-world experiences.

Content updating component 118 may be configured to update the sets of content in electronic storage 122 correlated to the digital assets of the set. The sets of content may be updated based on the one or more real-world experiences determined. In some implementations, the individual real-world experiences may be associated with a content update to a set of content, and a correlated digital asset, that is of a content type that is the related to the type of experience of the real-world experiences. The content updates associated with the real-world experiences may be stored in electronic storage 122. The content updates may be produced and stored by creators and/or designers of the real-world experiences. In some implementations, the content updates corresponding to the real-world experiences may update the set of content correlated to the digital asset that is particular to the visit. In some implementations, the individual real-world experiences may correspond with a content update to more than one piece of content and thus more than one digital asset owned by the user. For example, the set of content of the ride attraction content type, correlated to the first digital asset specific to the ride attraction experience type, may be updated to colorize the first content upon the user riding the first ride attraction a second time. Further, the set of content specific to the visit, and correlated to the second digital asset, may be updated to include the first content that is colored.

In some implementations, updating the sets of content correlated to the digital assets of the set stored in electronic storage 122 may be based on identifying the sets of content by the identifiers, i.e., the set of digital assets. In some implementations, some or all content updates to the content may be unpermitted (i.e., a given set of content correlated to a given digital asset is locked). In some implementations, some or all content updates to the content may be permitted (i.e., the given set of content correlated to the digital asset may be added to, removed, adjusted, and/or other updates). In some implementations, content updating component 118 may be configured to determine whether the content updates are permitted or unpermitted. Updating the sets of content correlated to the digital assets may be responsive to determining that the content updates are permitted. Upon determining that the content updates are unpermitted, the sets of content correlated to the digital assets may not be updated. In some implementations, some or all of the content updates to the content may be permanently present. In some implementations, some or all of the content updates may be present temporarily. The temporary content updates may be present for an amount of time, an amount of views, and/or other temporary period of time. The amount of time, the amount of views, the other temporary period of time, and/or the permission of the content updates may be defined and/or modified by an administrative user and received by content updating component 118. In some implementations, the content update to the particular content may include adding the keywords, the start and/or the end dates, one or more of the other identifiers, and/or other information related to the real-world experience.

Content viewing component 120 may be configured to receive a request to view the sets of content correlated to the one or more digital assets of the set held by the user. The request may include one or more of the identifiers, one or more of the other identifiers associated with the digital assets and its content, and/or other information. Responsive to and based on the request, content viewing component 120 may be configured to obtain the sets of content from electronic storage 122.

Content viewing component 120 may be configured to effectuate presentation of the sets of content subsequent to the obtainment. The particular content may reflect the content updates that were implemented based on the real-world experiences. The sets of content may be presented via a graphical user interface of a computing platform (similar to client computing platform 104) associated with the user or used to access the sets of content by the user (e.g., a kiosk). In some implementations, the user/owner of the digital assets may update the correlated set of content. Via the graphical user interface, the user may modify the other identifiers for the digital assets, the sets of content that was updated based on the real-world experiences, and/or implement other adjustments. For example, the general video may be adjusted by the user so that portions of the general video are in slow-motion. As another example, the user may adjust a photo added to the set of content correlated to the second digital asset to be in black and white. As another example, the general photo may be removed from the set of content.

Figure 3:
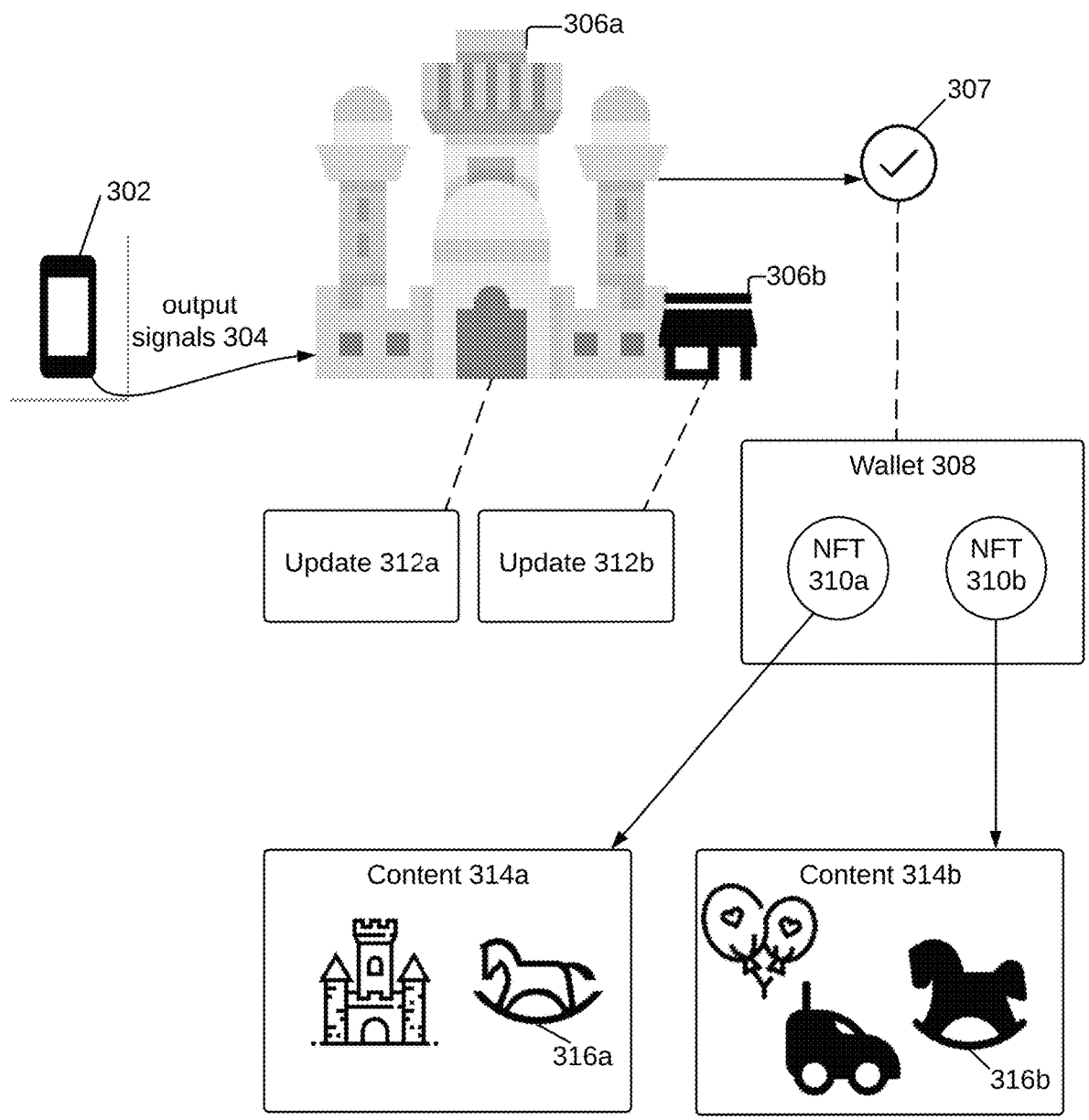
FIG. 3 illustrates an exemplary implementation of the system configured to compilate an experience summary based on real-world experiences, in accordance with one or more implementations.

FIG. 3 illustrates the system configured to compile an experience summary based on real-world experiences, in accordance with one or more implementations. FIG. 3 illustrates a physical item 302 (e.g., personal smartphone) that may enter or become proximate to ride attraction 306*a*, a real-world experience. Physical item 302 may be associated with or owned by a user (not illustrated). Upon physical item 302 entering or becoming in close proximity (e.g., a predefined distance) to ride attraction 306*a*, to a client computing platform associated with ride attraction 306*a*, or to an item sensor coupled with ride attraction 306*a*, output signals 304 may be received by processors associated with ride attraction 306*a* (e.g., by authenticating component 108 of FIG. 1) as authentication information. Upon determination that the authentication information is valid 307 and thus the identity of the user is verified, a set of non-fungible tokens (NFTs) 310*a* and 310*b* included in a wallet 308 associated with the user may be determined digital assets. Wallet 308 may correspond to an address tracked on a decentralized ledger (not illustrated, similar to decentralized ledger(s) 117 of FIG. 1) such that the decentralized ledger includes transactions involving the address that indicate ownership by the user. NFT 310*a* may be a ride attraction NFT (i.e., a type of experience) that correlates to set of content 314*a* stored in electronic storage (e.g., the same as or similar to electronic storage 122 illustrated in FIG. 1) representing ride attractions the user has ridden. NFT 310*b* may be a purchase NFT (i.e., a type of experience) that correlates to set of content 314*b* stored in the electronic storage representing purchases of consumer items. Ride attraction 306*a* may be associated with content update 312*a* applicable to content 314*a*. A gift shop 306*b* related to ride attraction 306*a* may be associated with content update 312*b* applicable to content 314*b*. Responsive to determining that the user rode ride attraction 306*a*, content 314*a* may be updated with content update 312*a* so that content 316*a* is added. Responsive to determining that the user bought a toy at gift shop 306*b*, content 314*b* may be updated with content update 312*b* so that content 316*b* is added. Thus, the content associated with the NFTs reflect the real-world experiences of the user.

Referring back to FIG. 1, in some implementations, server(s) 102, client computing platform(s) 104, and/or external resources 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may comprise non-transitory storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute components 108, 110, 112, 118, and/or 120, and/or other components. Processor(s) 124 may be configured to execute components 108, 110, 112, 118, and/or 120, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 118, and/or 120 are illustrated in FIG. 1 as being implemented within a single processing unit, in implementations in which processor(s) 124 includes multiple processing units, one or more of components 108, 110, 112, 118, and/or 120 may be implemented remotely from the other components. The description of the functionality provided by the different components 108, 110, 112, 118, and/or 120 described below is for illustrative purposes, and is not intended to be limiting, as any of components 108, 110, 112, 118, and/or 120 may provide more or less functionality than is described. For example, one or more of components 108, 110, 112, 118, and/or 120 may be eliminated, and some or all of its functionality may be provided by other ones of components 108, 110, 112, 118, and/or 120. As another example, processor(s) 124 may be configured to execute one or more additional components that may perform some or all of the functionality attributed below to one of components 108, 110, 112, 118, and/or 120.

Figure 2:
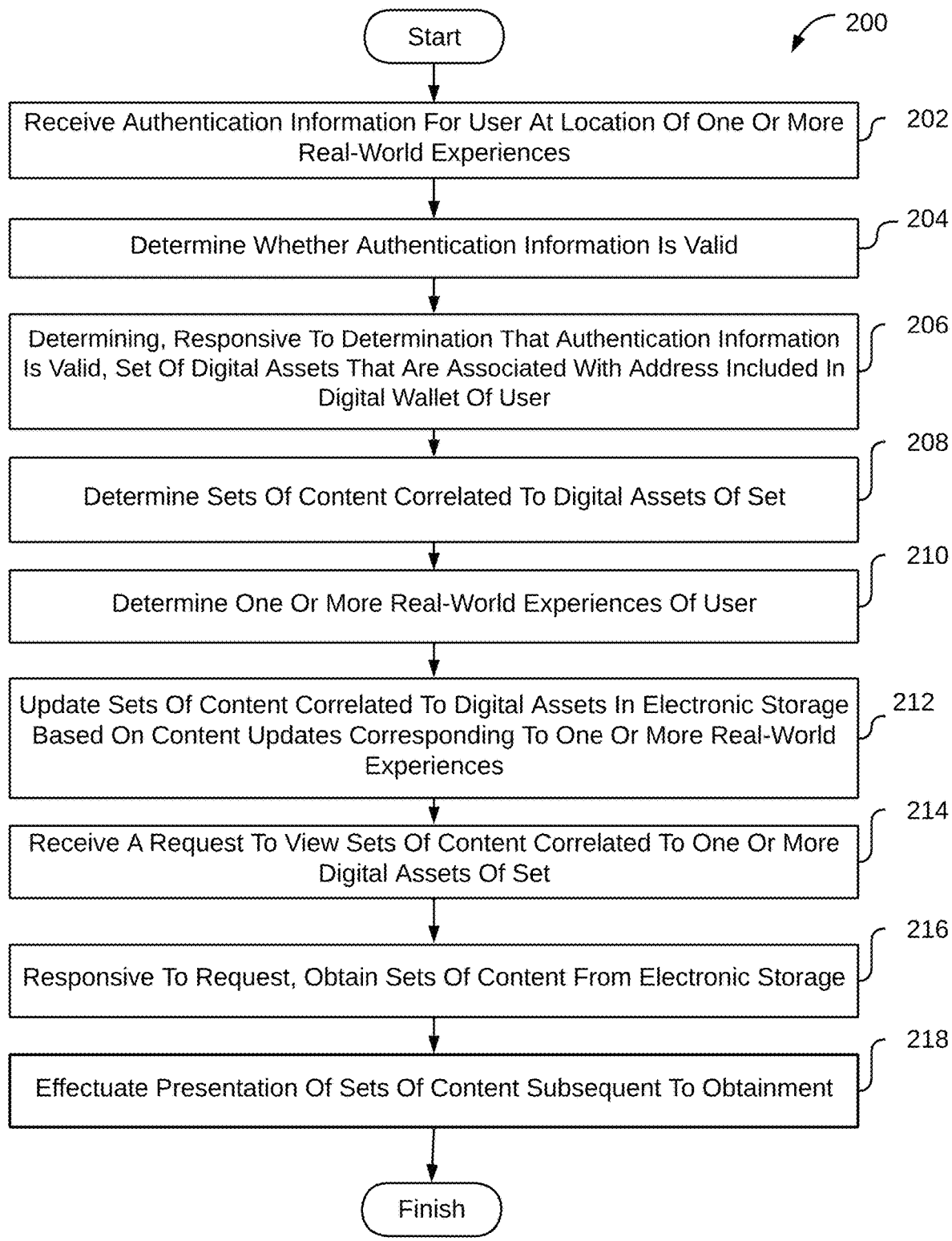
FIG. 2 illustrates a method to compilate an experience summary based on real-world experiences, in accordance with one or more implementations.

FIG. 2 illustrates a method 200 to compile an experience summary based on real-world experiences, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include receiving authentication information for a user at a location of one or more real-world experiences. Operation 202 may be performed by one or more hardware processors configured by machine-readable instructions including a component that is the same as or similar to authenticating component 108, in accordance with one or more implementations.

An operation 204 may include determining whether the authentication information is valid. Operation 204 may be performed by one or more hardware processors configured by machine-readable instructions including a component that is the same as or similar to authenticating component 108, in accordance with one or more implementations.

An operation 206 may include determining, responsive to determination that the authentication information is valid, a set of digital assets that are associated with an address included in a digital wallet of the user based on transactions recorded on a decentralized ledger. Operation 206 may be performed by one or more hardware processors configured by machine-readable instructions including a component that is the same as or similar to token determination component 112, in accordance with one or more implementations.

An operation 208 may include determining sets of content correlated to the digital assets of the set. Operation 208 may be performed by one or more hardware processors configured by machine-readable instructions including a component that is the same as or similar to token determination component 112, in accordance with one or more implementations.

An operation 210 may include determining the one or more real-world experiences of the user. Individual real-world experiences may be associated with content updates. Operation 210 may be performed by one or more hardware processors configured by machine-readable instructions including a component that is the same as or similar to experience determination component 112, in accordance with one or more implementations.

An operation 212 may include updating the sets of content correlated to the digital assets in the electronic storage based on the content updates associated with the one or more real-world experiences. Operation 212 may be performed by one or more hardware processors configured by machine-readable instructions including a component that is the same as or similar to content updating component 118, in accordance with one or more implementations.

An operation 214 may include receiving a request to view the sets of content correlated to the one or more digital assets of the set. Operation 214 may be performed by one or more hardware processors configured by machine-readable instructions including a component that is the same as or similar to content viewing component 120, in accordance with one or more implementations.

An operation 216 may include responsive to the request, obtaining the sets of content from the electronic storage. Operation 216 may be performed by one or more hardware processors configured by machine-readable instructions including a component that is the same as or similar to content viewing component 120, in accordance with one or more implementations.

An operation 218 may include effectuating presentation of the sets of content subsequent to the obtainment. The sets of content may reflect the update. Operation 218 may be performed by one or more hardware processors configured by machine-readable instructions including a component that is the same as or similar to content viewing component 120, in accordance with one or more implementations.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for compiling an experience summary based on real-world experiences, the system comprising:
electronic storage configured to store individual sets of content correlated with individual digital assets, wherein the digital assets are associated with content types such that the individual sets of content correlated to the individual digital assets are of the content types; one or more processors; and a memory storing machine-readable instructions that when executed by the one or more processors cause the one or more processors to:
receive authentication information for a user at a location of one or more real-world experiences;
determine whether the authentication information is valid;
determine, responsive to determination that the authentication information is valid, a set of digital assets that are associated with an address included in a digital wallet of the user based on transactions recorded on a decentralized ledger indicating that the user owns the set of the digital assets, wherein the transactions include the address and the set of the digital assets, wherein the digital wallet includes a private key that provides the user with access to consideration sent to the address;
determine the sets of content stored in the electronic storage that are correlated to the digital assets of the set;
determine the one or more real-world experiences of the user, wherein individual real-world experiences are associated with content updates to the content that are of the content types, wherein individual ones of the content updates are permitted or unpermitted to update the sets of content correlated to the digital assets;
determine whether the content updates are permitted or unpermitted; and
update, upon determination that the content updates are permitted, the sets of content in the electronic storage and correlated to the digital assets of the set based on the content updates associated with the one or more real-world experiences.

2. The system of claim 1, wherein the individual digital assets are individual identifiers by which the individual digital assets are identified on the decentralized ledger and in the electronic storage, such that:
updating the sets of content correlated to the digital assets of the set stored in the electronic storage is based on the set of the digital assets.

3. The system of claim 1, wherein updating the sets of content correlated to the digital assets of the set includes adding content, removing content, and/or adjusting content.

4. The system of claim 3, wherein the sets of content includes one or more of an animation, a visual presentation theme, an audio presentation theme, a description, and/or a special effect.

5. The system of claim 1, wherein the machine-readable instructions that when executed by the one or more processors further cause the one or more processors to:
receive a request to view the sets of content correlated to the digital assets of the set;
responsive to the request, obtain the sets of content from the electronic storage; and
effectuate presentation of the sets of content subsequent to the obtainment, wherein the sets of content reflect the update.

6. The system of claim 5, wherein the content updates that update the sets of content are present for a temporary amount of time or for an amount of views with the request.

7. The system of claim 5, wherein the content updates that update the sets of content are present permanently.

8. A method for compiling an experience summary based on real-world experiences, the method comprising:

receiving, by a system, authentication information for a user at a location of one or more real-world experiences;

determining, by the system, whether the authentication information is valid;

determining, by the system, responsive to determination that the authentication information is valid, a set of digital assets that are associated with an address included in a digital wallet of the user based on transactions recorded on a decentralized ledger indicating that the user owns the set of the digital assets, wherein the transactions include the address and the set of the digital assets, wherein the digital wallet includes a private key that provides the user with access to consideration sent to the address;

determining, by the system, in electronic storage, sets of content correlated the digital assets of the set;

determining, by the system, the one or more real-world experiences of the user, wherein individual real-world experiences are associated with content updates to the content that are of the content types, wherein individual ones of the content updates are permitted or unpermitted to update the sets of content correlated to the digital assets;

determining, by the system, whether the content updates are permitted or unpermitted; and updating, by the system, upon determination that the content updates are permitted, the sets of content in the electronic storage and correlated to the digital assets of the set based on the content updates associated with the one or more real-world experiences.

9. The method of claim 8, wherein the individual digital assets are individual identifiers by which the individual digital assets are identified on the decentralized ledger and in the electronic storage, such that:

updating the sets of content correlated to the digital assets of the set stored in the electronic storage is based on the set of the digital assets.

10. The method of claim 8, wherein updating the sets of content correlated to the digital assets of the set assets includes adding content, removing content, and/or adjusting content.

11. The method of claim 10, wherein the sets of content includes one or more of an animation, a visual presentation theme, an audio presentation theme, a description, and/or a special effect.

12. The method of claim 8, further comprising:

receiving a request to view the sets of content correlated to the digital assets of the set;

responsive to the request, obtaining the sets of content from the electronic storage; and effectuating presentation of the sets of content subsequent to the obtainment, wherein the sets of content reflect the update.

13. The method of claim 12, wherein the content updates that update the sets of content are present for a temporary amount of time or for an amount of views with the request.

14. The method of claim 12, wherein the content updates that update the sets of content are present permanently.

* * * * *